US012631033B2

(12) United States Patent
Dumenigo

(10) Patent No.: US 12,631,033 B2
(45) Date of Patent: May 19, 2026

(54) TRUSS TRANSPORTATION AND LEVELING APPARATUS

(71) Applicant: Jayson Dumenigo, Canyon Country, CA (US)

(72) Inventor: Jayson Dumenigo, Canyon Country, CA (US)

( * ) Notice: Subject to any disclaimer, the term of this patent is extended or adjusted under 35 U.S.C. 154(b) by 261 days.

(21) Appl. No.: 18/218,103

(22) Filed: Jul. 5, 2023

(65) Prior Publication Data

US 2025/0012101 A1 Jan. 9, 2025

(51) Int. Cl.
*B66F 5/00* (2006.01)
*E04G 5/00* (2006.01)

(52) U.S. Cl.
CPC ................ *E04G 5/004* (2013.01); *B66F 5/00* (2013.01)

(58) Field of Classification Search
CPC ... B66F 5/00; B66F 5/02; B23P 19/04; B23Q 3/06
See application file for complete search history.

(56) References Cited

U.S. PATENT DOCUMENTS 4,862,336 A 8/1989 Richardson et al.
4,998,336 A * 3/1991 Papsdorf ................ B27F 7/155 269/910
5,993,030 A 11/1999 Barcel
RE37,797 E 7/2002 Haase
6,560,858 B1 5/2003 McAdoo
8,099,913 B1 1/2012 Dodd
8,342,545 B2 1/2013 Mayo
10,875,714 B2 12/2020 Grove et al.
2009/0226282 A1 9/2009 Starr
2009/0289403 A1 * 11/2009 Muncie .................... E04C 3/08 269/329
2013/0085003 A1 4/2013 Oh et al.
2016/0060861 A1 3/2016 Darden
2016/0280246 A1 * 9/2016 Pino .......................... B66F 5/02
2021/0354961 A1 * 11/2021 Kiragu .................... B66F 7/065
2025/0012101 A1 * 1/2025 Dumenigo .............. E04G 5/004

* cited by examiner

*Primary Examiner* — Lee D Wilson
(74) *Attorney, Agent, or Firm* — Next 1P Law Group

(57) ABSTRACT

A truss transporting and leveling apparatus (TTLA) that provides a mechanism by which & single person can quickly and easily raise a truss structure and then transport, move and level the truss structure to a required or desired location. The preferred embodiment of the TTLA is comprised of the following major elements: a rear panel, a right side panel, a left side panel, a front panel, leveling mechanism, mobility mechanism, and at least one mounting bolt. The mounting bolt(s) are inserted through an opening on a truss structure, thereby securing the bolt to the truss structure. A nut secures the bolt within a side-oriented T-shape opening while allowing the area of the bolt between flanges to move within horizontal and vertical sections of the opening. A bolt is initially forced from the horizontal section upward into the upper end of the vertical section and then when the jack and upper support platform have completely traveled, the bolt drops downward into the lower end of the vertical section, thereby maintaining the upper support platform at the elevated position.

24 Claims, 8 Drawing Sheets

TRUSS TRANSPORTATION AND LEVELING APPARATUS

TECHNICAL FIELD

The invention generally pertains to stage or other productions devices/hardware, and more particularly to an apparatus that allows a single person to transport and level a truss structure to a required or desired location.

BACKGROUND ART

Many productions or events take place in a building which requires a stage that is either a permanent part of the building structure or is assembled for the particular event. Outdoor events typically need a stage to be assembled. Often, above a stage there are lights, projectors, cameras or other items that provide many of the visual elements required for the event which, for example, could be a music concert or a play.

In order to maintain lights, or other items above a stage, a truss is often utilized. While a single truss could be used, there are usually multiple trusses maintaining various types and colors of lights and other items are positioned on a truss to direct light or attention to a specific location on the stage, including lights and other items that can be remotely controlled to change direction during a performance on the stage. But again it is important to note that the truss/trusses are the structure which are maintaining the lights and other items above the stage.

A single truss can have various dimensions, especially length, depending on the number of, type of and size of the various lights and other items attached to the truss and suspended above the stage. Since the truss(es) are above the stage, along with all the items attached to the truss(es), it is important to realize the truss(es) and other items are also above the performers or occasionally above the front rows of a audience members/spectators. As a result of this it is very important that the truss(es) are well secured in place above the stage. Considering this, along with the fact that the truss(es) are typically heavy and can be cumbersome, the movement/positioning of the truss(es) to the required location often requires multiple individuals, who work together to lift and move the truss(es). It is usually not practical for one or two people to drag the truss(es) to the required location.

As previously disclosed, many types of productions especially live productions such as music/concerts or theatre/plays are performed on a stage. Depending on the location of, and type of venue where the production is occurring the stage can be permanently installed (as part of the venue building) or the stage can be assembled by the performer's crew. A key element of a typical stage is a truss or a structure made up multiple trusses. Depending on the requirement(s) of the venue, the production and/or the performers, the truss(es) can be used to support items above or adjacent the stage, such as lights or speakers, or even the stage platform itself.

For a moderately sized stage that is not permanently installed and requires stage platform support as well as lights and audio components, there can be a significant number of trusses utilized. Considering that the trusses must all be in place before a stage platform, lights or audio components can be secured in place, a substantial amount of work/effort is usually necessary.

Since it is of upmost importance that items supported by, or secured to a truss remain safely in place, a first step is to ensure the trusses have been placed/assembled correctly with maximum care. As a result, of the safety requirement, and the fact that a truss (and particularly multiple trusses) require considerable effort by multiple individuals to guarantee the trusses have been assembled correctly/adequately.

Two of the most important parts of truss assembly is the securing of multiple trusses together and to the stage platform, and to make sure the trusses are level especially for a stage platform. Often the individuals assembling trusses will have to move/transport the multiple trusses to the correct location. This typically necessitates the trusses being carried by hand (often by several individuals) or transported by a dolly or similar device. This is usually time consuming work that requires much physical labor/effort. Once a truss is in place the individuals must then lift and position each truss to ensure the trusses are level. This is usually accomplished by visually ascertaining if a truss is level, and/or using a level device/tool which is also repetitive and time-consuming.

It would be a substantial benefit if there was an apparatus or device that would allow a truss to be quickly and easily transported to a location, preferably by a single person, and then raised or lowered to a level position either manually or by a power-assisted means. This would save time and effort (and money) while guaranteeing that a truss or trusses have been correctly and safety assembled. Additionally, an apparatus such as this could greatly assist in the removal of trusses from a production, such as when the production travels from one location to another location.

A search of the prior art did not disclose any literature or patents that read directly on the claims of the instant invention. However, the following U.S. patents are considered related:

| U.S. Pat. No. | INVENTOR | ISSUED |
|---|---|---|
| RE37,797 | Haase | Jul. 23, 2002 |
| 8,099,913 | Dodd | Jan. 24, 2012 |
| 10,875,714 | Grove, et al | Dec. 29, 2020 |
| 2013/0085003 | Christie, et al | Mar. 28, 2013 |

The RE37,797 patent discloses methods and apparatus for assembling a truss. A truss table apparatus includes a truss table and a roller assembly. The truss table includes guides and a work surface which supports the truss members. The guides are coupled to sides of the truss table. A roller assembly is coupled to the truss table and includes a roller for pressing nailing plates into the truss. The roller assembly also presses nailing plates into the truss and includes drive wheels that rest on the truss table. The roller assembly further includes pressure wheels coupled to the truss to maintain the proper spacing between the roller and the truss table.

The U.S. Pat. No. 8,099,913 discloses a wheeled truss that is convertible into a truss with a catwalk. A carriage is mounted to the bottom of the truss for transporting the truss to a site. The carriage is removed from the truss, inverted and mounted to the top of the truss.

The U.S. Pat. No. 10,875,714 discloses the truss sections used at concerts and shows to support displays, cameras, sound and lighting equipment. During transport or stoppage, the truss sections are attached. An apparatus is mounted to a cross member of a truss and comprises depressions on the surface. Longitudinal members of a second truss section can be positioned within the depressions to limit movement between truss sections.

The 2013/0085003 publication discloses a truss and trolley assembly for the transport and assembly of truss components. The truss has a pair of substantially parallel side walls and the bottoms of the side walls have couplers. The frame has an upper wall which is connected to top surface of each of the side walls. The frame also has tracks, mounted to an inside surface of the side walls and a fixture mount mounted on the tracks of rollers. A plurality of vertical supports extend from the base and each support receives corresponding couplers.

For background purposes and indicative of the art to which the invention relates, reference may be made to the following remaining patents found in the patent search.

| U.S. Pat. No. | INVENTOR | ISSUED |
|---|---|---|
| 4,862,336 | Richardson, et al | Aug. 29, 1989 |
| 5,993,030 | Barcel | Nov. 30, 1994 |
| 6,560,858 | McAdoo | May 13, 2005 |
| 8,342,545 | Mayo | Jan. 1, 2013 |
| 200/0226282 | Starr | Sep. 20, 2009 |
| 2016/0060861 | Darden | Mar. 3, 2016 |

DISCLOSURE OF THE INVENTION

A truss transporting and leveling apparatus (TTLA) that allows a single person to transport a truss structure from one location to another, and to raise/level the truss structure. The preferred embodiment of the TTLA is comprised of a box structure having a rear panel, a right side panel, a left side panel, a front panel, a lower support plate, and an upper support plate that is located above the lower support plate within the TTLA.

The TTLA is preferably made of a strong, rigid material such as metal, although other materials including plastic, wood or a composite can also be utilized. Located on the rear surface is at least one, and preferably four, side-oriented T-shape openings. Each of the openings is specially designed to allow a mounting bolt, which is first inserted through an opening on a truss structure, to enter into a section of the T-shape opening.

Located within the TTLA, beneath the upper support plate, and laying on the lower support plate is a leveling means, such as a jack, that can be raised (or lowered). As the jack is raised, the upper support plate is also raised. The mounting bolts extending from the truss structure enter into and are secured within the T-shape opening. The unique design of the T-shape opening forces each of the mounting bolts to slideably move from one section of the T-shape opening to another section. Once the mounting bolt has completed its travel within the T-shape opening, the truss structure is in an operable position, secured to the TTLA.

In the operable position, the truss structure can be leveled by further actuating the jack, and since the truss structure is raised off the ground, the TTLA can be moved by mobility means such as casters or wheels that extend downward from the lower support plate. As the TTLA is moved, the truss structure secured to the TTLA moves along as well, thereby allowing the truss structure to be transported to a required or desired location.

All of the panels of the TTLA are preferably integrally attached, although other attachment means such as screws or bolts and nuts can also be used to attach the panels together. To increase the stability of the TTLA, particularly when transporting a secured truss structure, a stabilizing member can be utilized. The stabilizing member is shaped as a rod, with one end attached to a side tab extending from a side edge of the front panel. Also, if desired the TTLA can include an upper panel that completely encloses the interior of the TTLA. Optimally, the upper panel is removably attached to allow access into the TTLA.

In view of the above disclosure the primary object of the invention is to provide a truss transporting and leveling apparatus that allows a single person to quickly and easily secure a truss structure onto an apparatus that allows the truss structure to raised off the ground and along with the secured truss structure, the apparatus can be moved from one location to another location.

In addition to the primary object, it is also an object of the invention to provide a truss transporting and leveling apparatus that:

- can be used with a variety of truss sizes and types,
- can function with a truss having no items attached, or with a truss having lights, cameras, or other items attached,
- is well-made, therefore durable and long-lasting,
- can be sold along with one or more trusses as a complete system,
- is easy to learn to operate,
- requires little or no maintenance,
- can reduce the likelihood of injuries related to installing/transporting trusses,
- can reduce the cost of producing a stage event, and
- is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
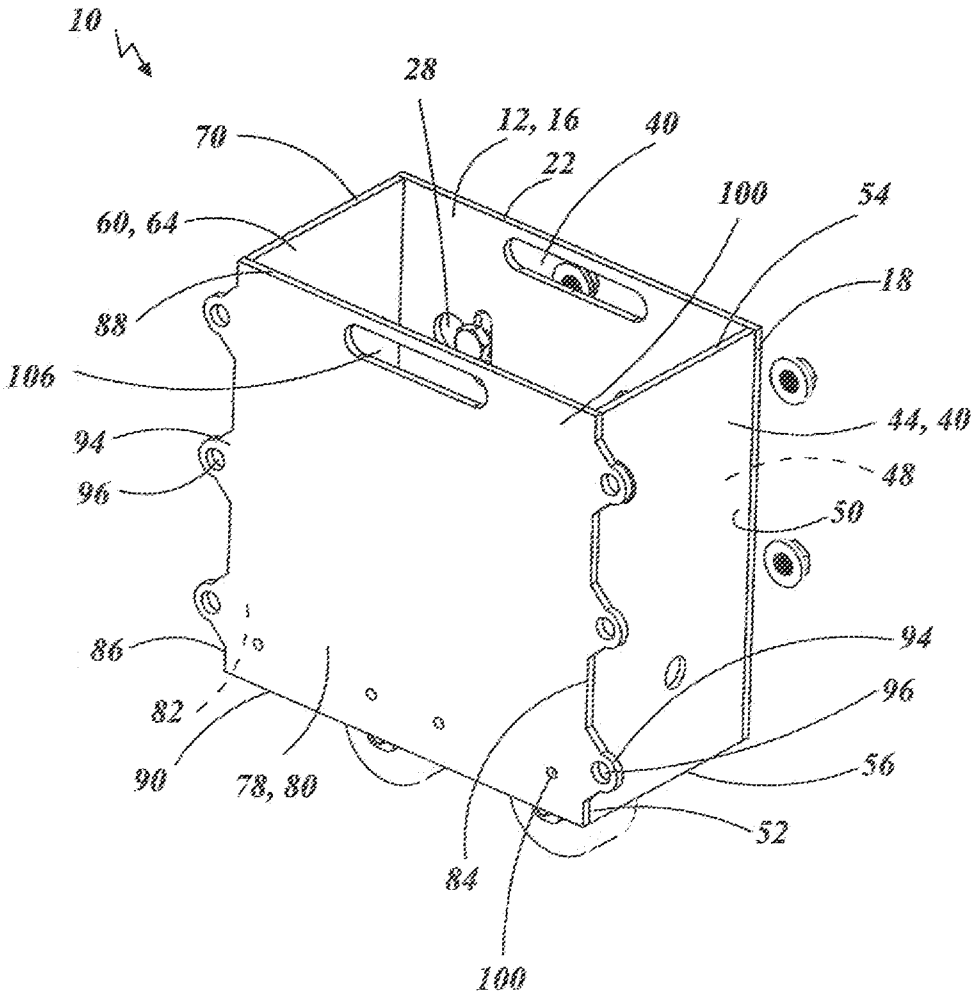
FIG. 1 is an orthographic front view showing a truss transporting and leveling apparatus (TTLA).

The best mode for carrying out the invention is presented in terms that disclose a preferred embodiment of a truss transporting and leveling apparatus (TTLA 10). Many stage productions require lights, projectors, speakers ad other items to be suspended above the stage. In order to accomplish this, one and usually multiple truss structures are utilized. The truss structures are located above the stage and the lights any other items are secured onto the truss structure. Typically, there will be multiple truss structures with various types and sizes of lights as well as the other items.

At some venues the truss assemblies with lights and other items are permanently installed, but for certain events, especially outdoor events or events not held in a purpose-built building, as well as acts that travel from one location to another location and carry their own lights, sound and production items with them, the truss structures must be assembled at each location. Even when made of a light-weight metal, truss structures can often be heavy, difficult to transport and cumbersome. As a result the transporting, lifting and leveling of truss structures usually require multiple people.

The inventive TTLA 10, as shown in FIGS. 1-10, provides a means by which a single person can quickly and easily raise a truss structure and then transport, move and level the truss structure to a required or desired location. The preferred embodiment of the TTLA 10 is comprised of the following major elements: a rear panel 12, a right side panel 44, a left side panel 60, a front panel 78, leveling means 148, mobility means 156, and at least one mounting bolt 176.

The rear panel 12, as shown in FIGS. 1-3 and 8-10, is comprised of an outer surface 14, an inner surface 167, a right edge 18, a left edge 20, an upper edge 22 and a lower edge 24. Configured on the rear panel 12 is at least one, and preferably four, side-oriented T-shape openings 28, with each T-shape opening 28 having a vertical section 30 with an upper rounded end 32 and a lower rounded end 34, and a horizontal section 36 that extends from a midpoint of the vertical section 30 and has a rounded end 38. In order to allow manual lifting and maneuvering of the TTLA 10, the rear panel can also have at least one hand opening 40.

The right side panel 44, as shown in FIGS. 1, 2, 9 and 10, comprises an outer surface 46, an inner surface 48, a right edge 50, a left edge 52, an upper edge 54 and a lower edge 54. The right edge 50 of the right side panel 44 is integrally attached to and bent perpendicularly inward from the rear panel right edge 18.

The left side panel 60, as shown in FIGS. 1, 2, 5, 9 and 10, is comprised of an outer surface 62, an inner surface 64, a right edge 66, a left edge 68, an upper edge 70, and a lower edge 72. The left side panel left edge 68 is integrally attached to and bent perpendicularly inward from the rear panel left edge 20.

Figure 2:
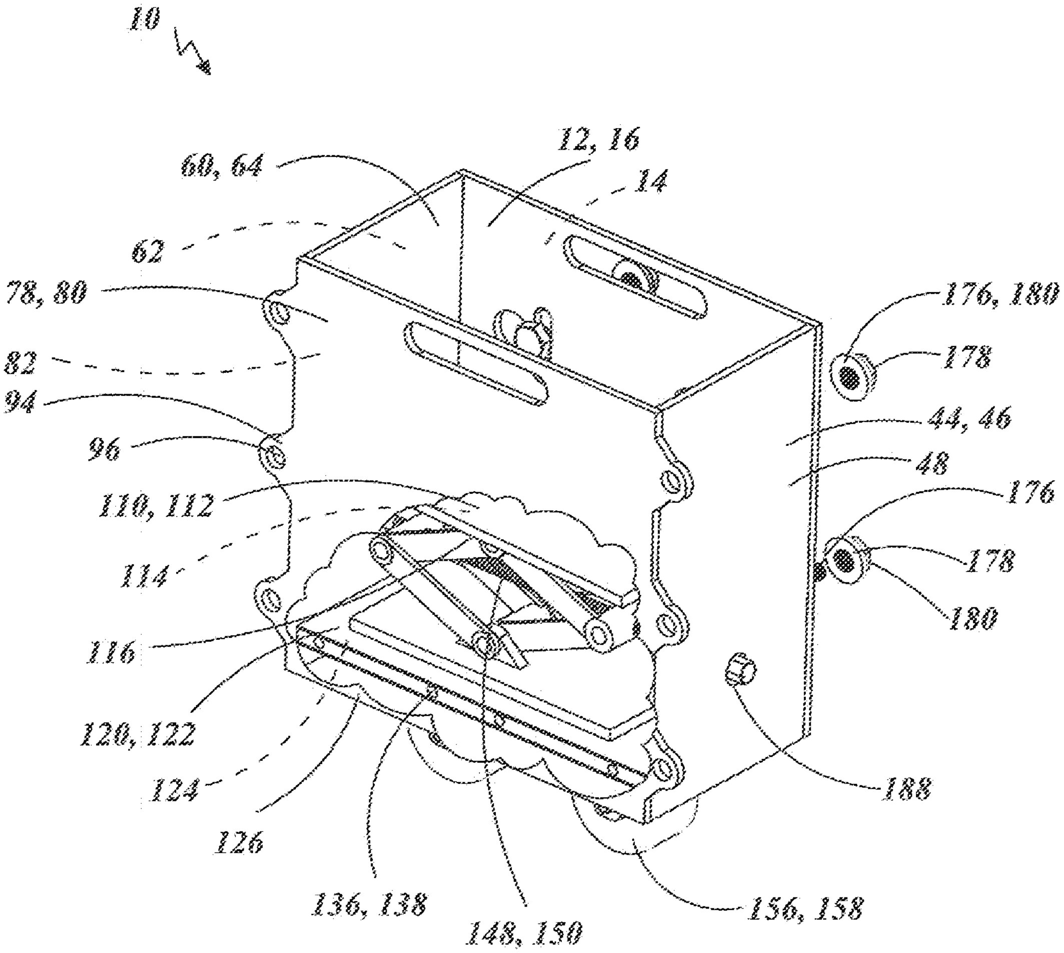
FIG. 2 is an orthographic front view of the TTLA with a cut-away showing a jack within the TTLA.
Figure 3:
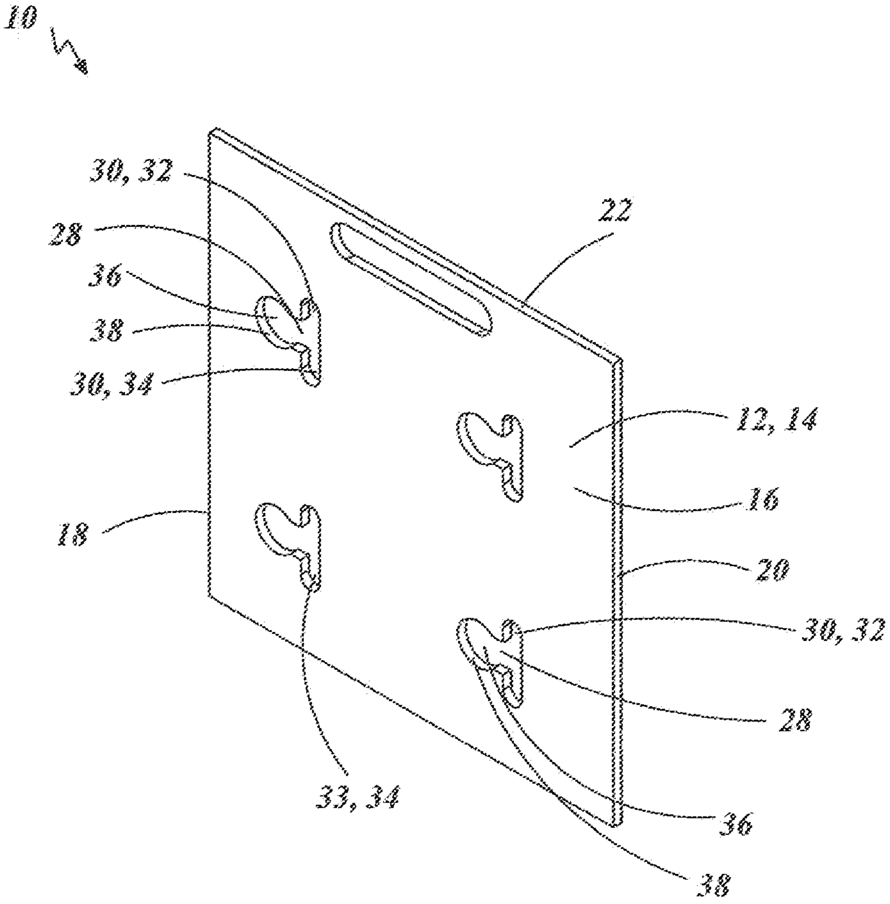
FIG. 3 is an orthographic view showing the TTLA rear panel.
Figure 4:
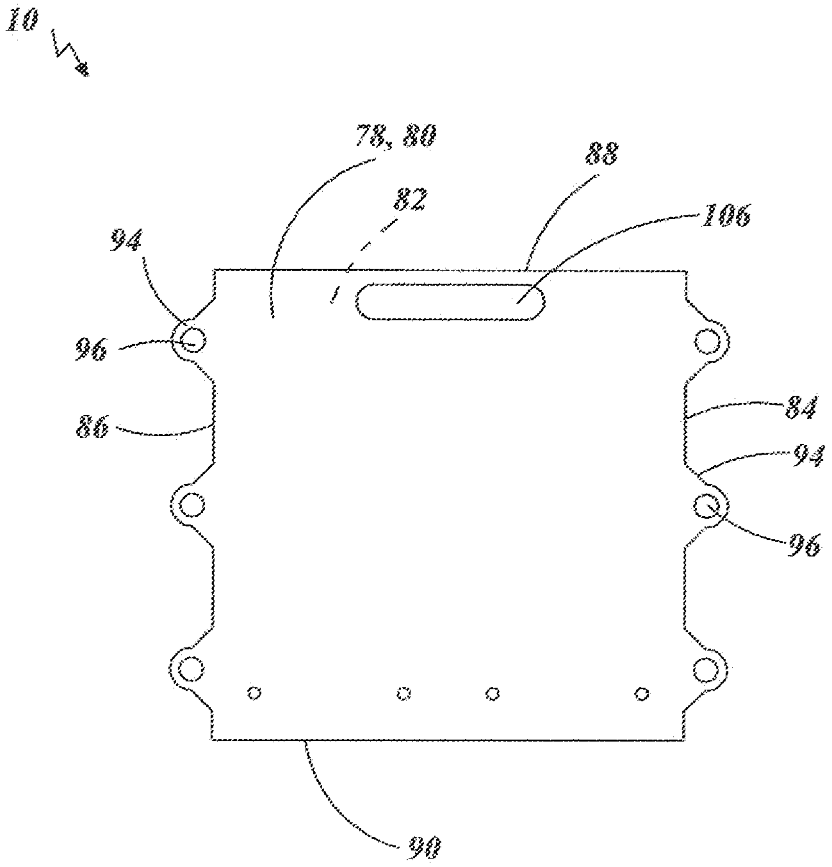
FIG. 4 is an elevational front view showing the TTLA front panel.

The front panel 78, as shown in FIGS. 1, 2, 4, 5, and 10, is comprised of an outer surface 80, an inner surface 82, a right edge 84, a left edge 86, an upper edge 88, and lower edge 90. Extending from the front panel right edge 84 or left edge 86 is at least one side tab 94 with a center bore 96. Also, as with the rear panel 12, the front panel 78 can have at least one hand opening 106, as shown in FIGS. 1-3.

Figure 8:
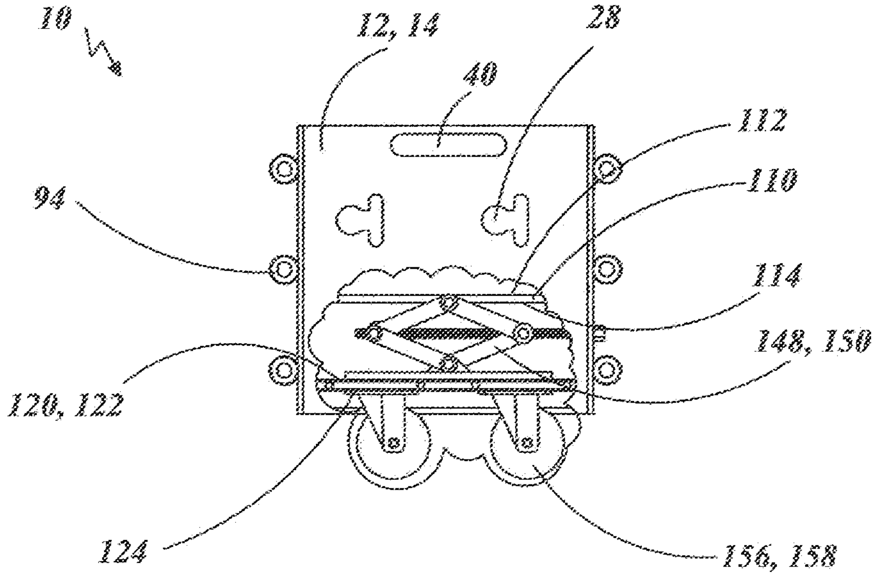
FIG. 8 is an elevational rear view of the TTLA with a cut-away showing the jack within the TTLA.
Figure 10:
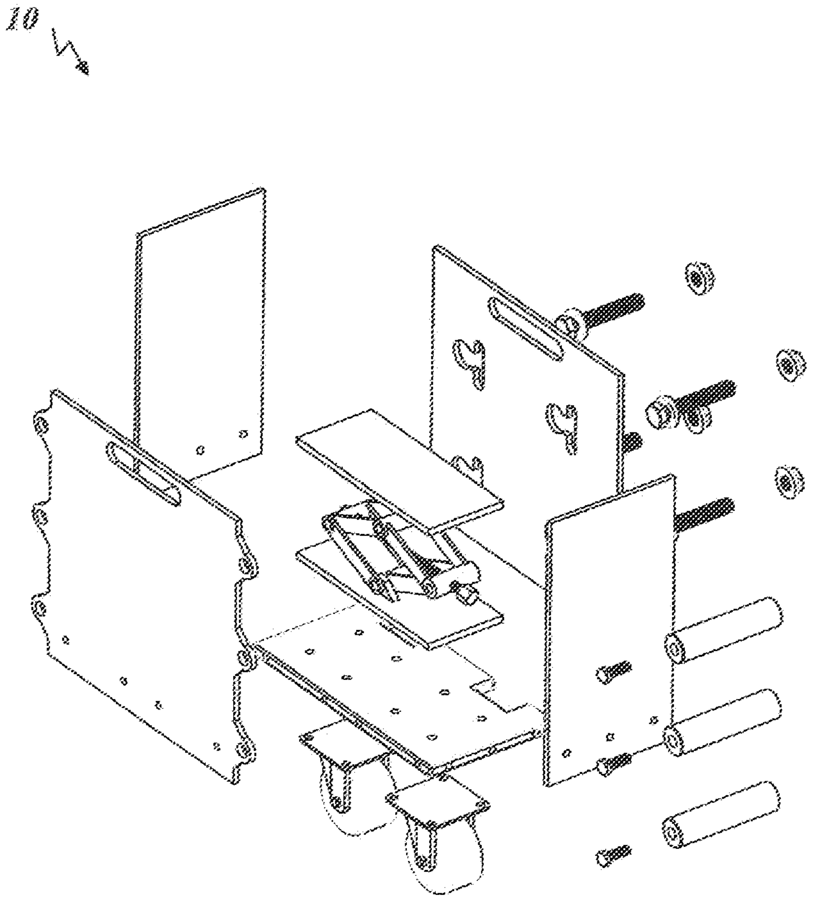
FIG. 10 is an exploded view showing the TTLA elements separated.

As shown in FIGS. 2, 8 and 10, located within the TTLA 10 is an upper support plate 110 that permanently interfaces with the inner surface 16 of the rear panel 12, the inner surface 48 of the right side panel 44, the inner surface 64 of the left side panel 60, and the inner surface 82 of the front panel 78. The upper support plate 110 comprises an upper surface 112, a lower surface 114, and a perimeter edge 116.

Figure 6:
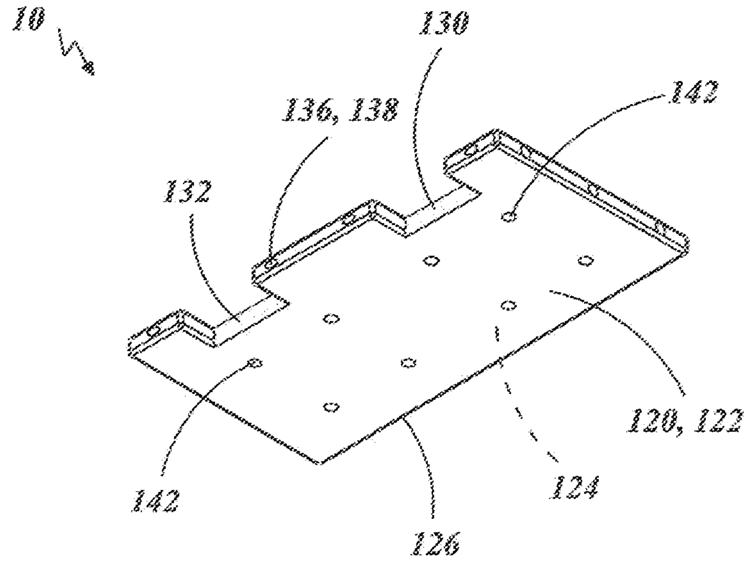
FIG. 6 is an orthographic view showing the TTLA lower support plate with two notches.
Figure 7:
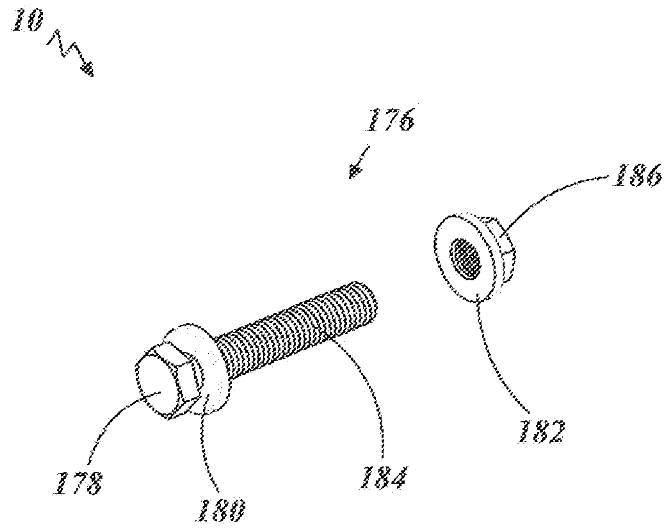
FIG. 7 is an orthographic view showing one of the TTLA mounting bolts.

A lower support plate 120 is also located within the TTLA 10 at the lower edges and interfacing with the inner surface 16 of the rear panel 12, the inner surface 48 of the right side panel 44, the inner surface 64 of the left side panel 60, and the inner surface 82 of the front panel 78. The lower support plater 120 comprises an upper surface 122, a lower surface 124 and a perimeter edge 126. Configured on a rear section of the perimeter edge 126 are a first notch 130 and a second notch 132, as shown in FIG. 6. Also, as shown in FIGS. 2 and 6, on a front section of the perimeter edge 126 are at least one bearing opening 136 that is configured to accept a pressed bearing 138.

Located between the lower support plate 120 and the upper support plate 110 is the leveling means 148, as shown in FIGS. 2, 8 and 10, which is preferably comprised of a jack 150 such as a manual scissor jack, a powered scissor jack, a pneumatic jack, or a hydraulic jack. As the jack is actuated upward, the upper support plate 110 also rises as the jack applies an upward force. In order to facilitate the actuation of the leveling means 148, a jack actuator opening 188 can be configured on the right side panel or left side panel depending on how the jack is oriented within the TTLA 10. The opening 188, as shown in FIGS. 1 and 2, allows either a tire iron to be inserted through the opening, onto the jack's actuator, or a powered device, such as a drill to be inserted through the opening and onto the jack's actuator.

The mobility means 156 allow the TTLA 10 with an attached truss to be easily transported from one location to another location. As shown in FIGS. 1, 2, 8 and 10, the mobility means 150 preferably comprise at least one caster 158, at least one wheel, or at least one ball roller that is attached to and extends downward from the lower surface 124 of the lower support plate 120.

Figure 5:
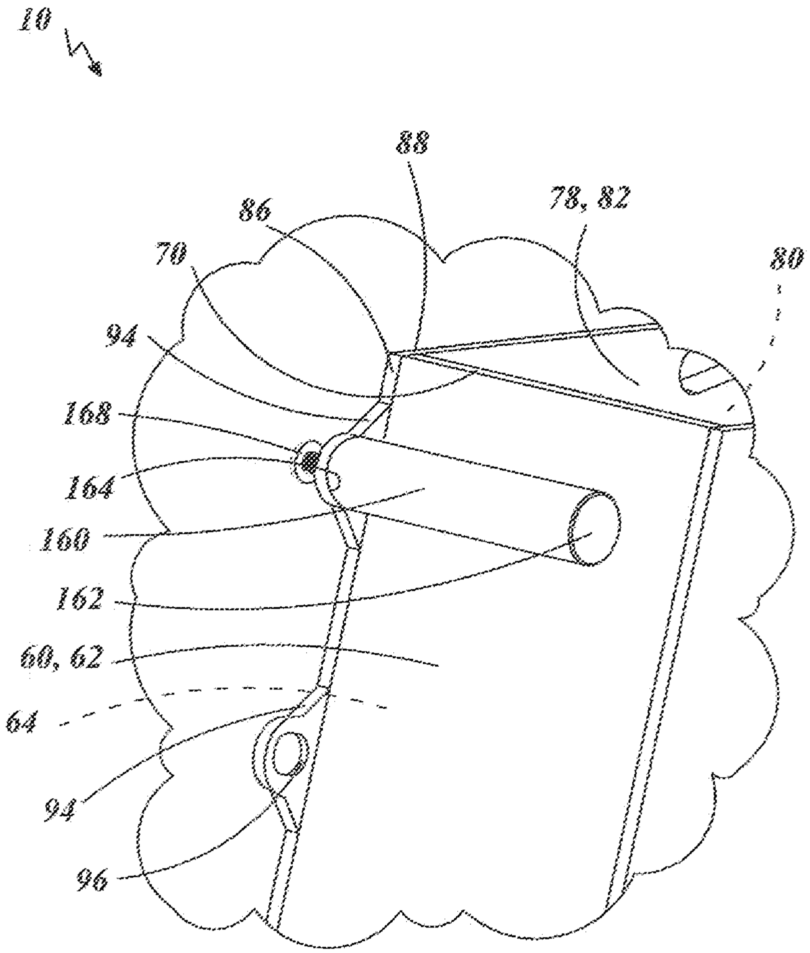
FIG. 5 is a detail view showing one TTLA stabilizing member secured onto a side tab on the TTLA right side panel.
Figure 9:
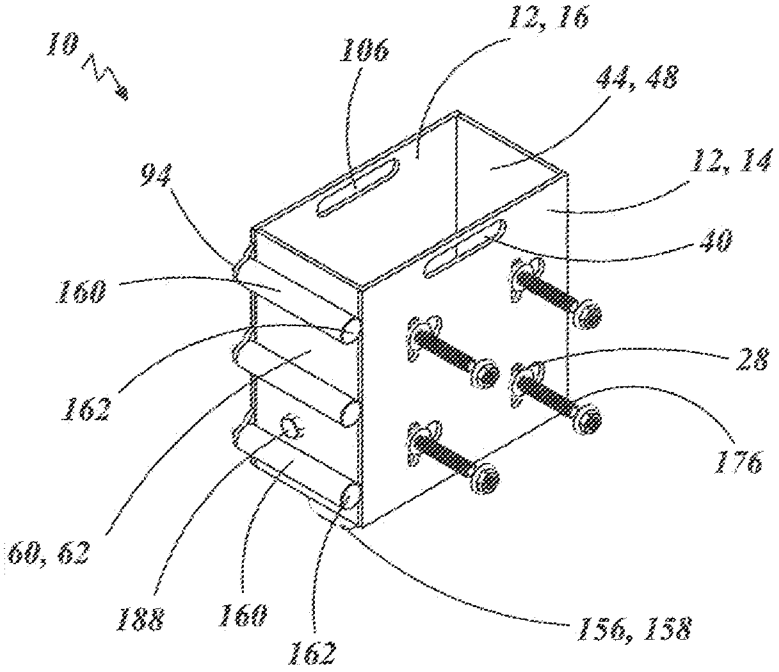
FIG. 9 is an orthographic rear view showing the TTLA with three secured stabilizing members on the right side surface and four mounting bolts inserted into side-oriented T-shape openings on the rear panel.

In order to increase the stability of the TTLA 10, especially when in motion with a truss attached, at least one stabilizing member 160 is utilized. The stabilizing member 160, as shown in FIGS. 5, 9 and 10, has a right end 162, a left end 164 with a threaded opening 166 on one of the ends. Depending on the requirement or desire, a stabilizing member 160 is secured onto one of the side tabs 94 on the front panel 78. The stabilizing member end is placed against the side tab and then securing bolt 168 with threads 170 is inserted through the side tab center bore 96 and the bolt is screwed into the stabilizing member thereby securing the stabilizing member on the side tab, with the stabilizing member 160 extending from the side tab longitudinally across the outer surface 80 of the front panel 78. Also, the stabilizing member 160 can be permanently attached to the side tab by means such as welding, machining or other similar methods.

The at least one mounting bolt 176 and preferably four mounting bolts, as shown in FIGS. 2, 7, 9 and 10, is comprised of a head 178, a first flange 180, a second flange 182, threads 184, and a nut 186. The mounting bolt(s) 176 are inserted through an opening on a truss structure, thereby securing the bolt 176 to the truss structure. The nut secures the bolt within the side-oriented T-shape opening while allowing the area of the bolt between the flanges to move within the horizontal and vertical sections of the opening, with the side-oriented T-shape opening specially configured such that when the bolt is within the opening the flanges maintain the bolt in position, and as the jack and upper support panel rise, the bolt is initially forced from the horizontal section upward into the upper end of the vertical section and then when the jack and upper support platform have completed their travel, the bolt drops downward into the lower end of the vertical section, thereby maintaining the upper support platform at the elevated position. In order to provide the necessary clearance for the bolts to travel, the two notches 130,132 on the lower support panel are utilized.

As an option, the TTLA 10, can also include an upper panel 190 which includes an outer surface 192, an inner surface 194, a right edge 196, a left edge 198, a rear edge 200, an a front edge 202. In order to provide access to the interior of the TTLA 10 when the upper panel 190 is utilized, upper panel attachment means 206 which can include clips or hinges can be used.

Also, in lieu of the rear panel, the two side panels and the front panel all being integrally attached, one, two or all of the panels can be secured together by means such as screws or bolts and nuts. While the TTLA 10 is preferably made of a strong/robust material such as metal, other materials including plastic, wood or a composite can also be utilized.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A truss transporting and leveling apparatus (TTLA) comprising:
- a rear panel having:
  - an outer surface,
  - an inner surface,
  - a right edge,
  - a left edge,
  - an upper edge
  - a lower edge and
  - at least one side-oriented T-shape opening comprising:
    - a vertical section with an upper rounded end and a lower rounded end,
    - a horizontal section that extends from a midpoint of the vertical section, and comprises a rounded end,
- a right side panel comprising:
  - an outer surface,
  - an inner surface,
  - a right edge,
  - a left edge,
  - an upper edge, and
  - a lower edge,
- a left side panel comprising:
  - an outer surface,
  - an inner surface,
  - a right edge,
  - a left edge,
  - an upper edge and
  - a lower edge,
- a front panel comprising:
  - an outer surface,
  - an inner surface,
  - a right edge,
  - a left edge,
  - an upper edge,
  - a lower edge, and
  - at least one side tab configured to extend from front panel right edge or left edge, and having a center bore,
  - panel attachment means for attaching the right side panel right edge to the rear panel right edge, the left side panel left edge to the rear panel left edge, the front panel right edge to the right side panel left edge, and the front panel left edge to the left side panel right edge,
- an upper support plate permanently interfacing with the inner surface of the rear panel, right side panel, left side panel and front panel, and comprising:
  - an upper surface,
  - a lower surface,
  - a perimeter edge,
- a lower support plate located at the lower edges and interfacing with the inner surfaces of the rear panel, right side panel, left side panel, and front panel, and comprising:
  - an upper surface,
  - a lower surface,
  - a perimeter edge,
  - a first notch configured on a rear section of the perimeter edge, and
  - a second notch configured on a rear section of the perimeter edge,
  - at least one bearing opening comprising a pressed bearing and,
  - at least one caster bore,
- leveling means comprising a jack that is configured on the upper surface of the lower support panel, and below the upper support panel, which is forced upward when the jack is actuated and raised,
- mobility means,
- at least one stabilizing member having:
  - a right end,
  - a left end,
  - a threaded opening on the right end or left end,
  - a securing bolt with threads that mate with the threaded opening on the right end or left end, the stabilizing member placed in contact with the side tab on the front panel, with the stabilizing member threaded opening aligned with the side tab center bore such that the securing bolt is inserted through the center bore into the stabilizing member threaded opening, where the bolt's threads mate with the threaded bore, maintaining the stabilizing member attached to, and extending from the side tab longitudinally, across the front panel,
  - at least one mounting bolt that is inserted through an opening on a truss structure, thereby securing the bolt to the truss structure, comprising;
    - a head,
    - a first flange configured adjacent the head,
    - a second flange configured at a distance from the first flange on the bolt threads, and
    - a nut for securing the bolt within the side-oriented T-shape opening while allowing the area of the bolt between the flanges to move within the horizontal and vertical sections of the opening, with the side-oriented T-shape opening specially configured such that when the bolt is within the opening the flanges maintain the bolt in position, and as the jack and upper support panel rise, the bolt is initially forced from the horizontal section upward into the upper end of the vertical section and then when the jack and upper support platform have completed their travel, the bolt drops downward into the lower end of the vertical section, thereby maintaining the upper support platform at the elevated position.

2. The truss transporting and leveling apparatus of claim 1, wherein the TTLA is made of a material selected from the group consisting of metal, wood, plastic and a composite.

3. The truss transporting and leveling apparatus of claim 1, wherein the rear panel further comprises a hand opening configured adjacent the upper edge at a substantial midpoint.

4. The truss transporting and leveling apparatus of claim 1, wherein the front panel further comprises a hand opening configured adjacent the upper edge at a substantial midpoint.

5. The truss transporting and leveling apparatus of claim 1, wherein the front panel further comprises an opening that allows a tire iron to be inserted through the opening for manually actuating the jack, or a powered device to be inserted through the opening for assisted actuation of the jack.

6. The truss transporting and leveling apparatus of claim 1, wherein the leveling means jack is selected from the group consisting of a manual scissor jack, a powered scissor jack, a pneumatic jack and a hydraulic jack.

7. The truss transporting and leveling apparatus of claim 1, wherein the mobility means are selected from the group consisting of at least one caster, at least one wheel, and at least one ball roller.

8. The truss transporting and leveling apparatus of claim 1, wherein the TTLA is slid on a ground surface without the use of mobility means.

9. The truss transporting and leveling apparatus of claim 1, wherein the stabilizing member is comprised of a rod.

10. The truss transporting and leveling apparatus of claim 1, wherein the rear panel, side panels and front panel attachment means are selected from the group consisting of screws, bolts and nuts, welding, clips, pins and bores, and an adhesive.

11. The truss transporting and leveling apparatus of claim 1, further comprising an upper panel comprising:
- an outer surface,
- an inner surface,
- a right edge,
- a left edge,
- a rear edge,
- a front edge, and
- attachment means for attaching the upper panel to the upper edges of the rear panel, the right side panel, the left side panel and the front panel, wherein with the upper panel attached a fully enclosed structure is created.

12. The truss transporting and leveling apparatus of claim 11, wherein the attachment means for attaching the upper panel are selected from the group consisting of screws, bolts and nuts, welding clips, pins and bores, and an adhesive.

13. A truss transporting and leveling apparatus (TTLA) comprising:
- a rear panel having:
  - an outer surface,
  - an inner surface,
  - a right edge,
  - a left edge,
  - an upper edge
  - a lower edge and
  - at least one side-oriented T-shape opening comprising:
    - a vertical section with an upper rounded end and a lower rounded end,
    - a horizontal section that extends from a midpoint of the vertical section, and comprises a rounded end,
- a right side panel comprising:
  - an outer surface,
  - an inner surface,
  - a right edge,
  - a left edge,
  - an upper edge, and
  - a lower edge, with the right side panel right edge integrally attached to, and bent perpendicularly inward from the rear panel right edge,
- a left side panel comprising:
  - an outer surface,
  - an inner surface,
  - a right edge,
  - a left edge,
  - an upper edge, and
  - a lower edge, with the left side panel left edge integrally attached to, and bent perpendicularly inward from the rear panel left edge,
- a front panel comprising:
  - an outer surface,
  - an inner surface,
  - a right edge,
  - a left edge,
  - an upper edge,
  - a lower edge, and
  - at least one side tab configured to extend from front panel right edge or left edge, and having a center bore,
- an upper support plate permanently interfacing with the inner surface of the rear panel, inner surface of the right side panel, inner surface of the left side panel and inner surface of the front panel, and comprising:
  - an upper surface,
  - a lower surface,
  - a perimeter edge,
- a lower support plate located at the lower edges and interfacing with the inner surface of the rear panel, inner surface of the right side panel, inner surface of the left side panel, and the inner surface of the front panel, and comprising:
  - an upper surface,
  - a lower surface,
  - a perimeter edge,
  - a first notch configured on a rear section of the perimeter edge, and
  - a second notch configured on a rear section of the perimeter edge,
  - at least one bearing opening comprising a pressed bearing and,
  - at least one caster bore,
- leveling means comprising a jack that is configured on the upper surface of the lower support panel, and below the upper support panel, which is forced upward when the jack is actuated and raised,
- mobility means,
- at least one stabilizing member having:
  - a right end,
  - a left end,
  - a threaded opening on the right end or left end,
- a securing bolt with threads that mate with the threaded opening on the right end or left end, the stabilizing member placed in contact with the side tab on the front panel, with the stabilizing member threaded opening aligned with the side tab center bore such that the securing bolt is inserted through the center bore into the stabilizing member threaded opening, where the bolt's threads mate with the threaded bore, maintaining the stabilizing member attached to, and extending from the side tab longitudinally, across the front panel,
- at least one mounting bolt that is inserted through an opening on a truss structure, thereby securing the bolt to the truss structure, the bolt comprising;
  - a head,
  - a first flange configured adjacent the head,
  - a second flange configured at a distance from the first flange on the bolt threads, and
  - a nut for securing the bolt within the side-oriented T-shape opening while allowing the area of the bolt between the flanges to move within the horizontal and vertical sections of the opening, with the side-oriented T-shape opening specially configured such that when the bolt is within the opening the flanges maintain the bolt in position, and as the jack and upper support panel rise, the bolt is initially forced from the horizontal section upward into the upper end of the vertical section and then when the jack and upper support platform have completed their travel, the bolt drops downward into the lower end of the vertical section, thereby maintaining the upper support platform at the elevated position.

14. The truss transporting and leveling apparatus of claim 13, wherein the TTLA is made of a material selected from the group consisting of metal, wood, plastic and a composite.

15. The truss transporting and leveling apparatus of claim 13, wherein the rear panel further comprises a hand opening configured adjacent the upper edge at a substantial midpoint.

16. The truss transporting and leveling apparatus of claim 13, wherein the front panel further comprises a hand opening configured adjacent the upper edge at a substantial midpoint.

17. The truss transporting and leveling apparatus of claim 13, wherein the front panel further comprises an opening that allows a tire iron to be inserted through the opening for manually actuating the jack, or a powered device to be inserted through the opening for assisted actuation of the jack.

18. The truss transporting and leveling apparatus of claim 13, wherein the leveling means jack is selected from the group consisting of a manual scissor jack, a powered scissor jack, a pneumatic jack and a hydraulic jack.

19. The truss transporting and leveling apparatus of claim 13, wherein the mobility means are selected from the group consisting of at least one caster, at least one wheel, and at least one ball roller.

20. The truss transporting and leveling apparatus of claim 13, wherein the TTLA is slid on a ground surface without the use of mobility means.

21. The truss transporting and leveling apparatus of claim 13, wherein the stabilizing member is comprised of a rod.

22. The truss transporting and leveling apparatus of claim 13, further comprising panel attachment means for attaching the right side panel right edge to the rear panel right edge, the left side panel left edge to the rear panel left edge, the front panel right edge to the right side panel left edge, and the front panel left edge to the left side panel right edge.

23. The truss transporting and leveling apparatus of claim 13, further comprising an upper panel comprising:

an outer surface,
an inner surface,
a right edge,
a left edge,
a rear edge,
a front edge, and
attachment means for attaching the upper panel to the upper edges of the rear panel, the right side panel, the left side panel and the front panel, wherein with the upper panel attached a fully enclosed structure is created.

24. The truss transporting and leveling apparatus of claim 13, wherein the attachment means for attaching the upper panel are selected from the group consisting of screws, bolts and nuts, welding clips, pins and bores, and an adhesive.

* * * * *